United States Patent [19]

Buehler, III

[11] Patent Number: 6,047,768
[45] Date of Patent: Apr. 11, 2000

[54] PROCESS AND APPARATUS FOR TREATING WASTE

[75] Inventor: Verne T. Buehler, III, Waukesha, Wis.

[73] Assignee: United States Filter Corporation, Palm Desert, Calif.

[21] Appl. No.: 08/851,645

[22] Filed: May 6, 1997

[51] Int. Cl.[7] ........................................... F28F 9/26
[52] U.S. Cl. ............................ 165/143; 165/108; 210/609
[58] Field of Search .................................. 165/143, 154, 165/163, 108, 104.11, 162; 210/609

[56] References Cited

U.S. PATENT DOCUMENTS

| | | | |
|---|---|---|---|
| 1,051,383 | 1/1913 | Bossé | 165/154 |
| 1,456,557 | 5/1923 | Imhoff . | |
| 2,259,433 | 10/1941 | Kitto | 165/154 |
| 2,303,063 | 11/1942 | Peebles et al. | 165/108 |
| 2,847,379 | 8/1958 | Spiegel et al. | 210/6 |
| 2,975,122 | 3/1961 | Laboon | 210/12 |
| 3,253,326 | 5/1966 | Henry et al. | 165/154 |
| 3,477,501 | 11/1969 | Van Es | 165/154 |
| 3,487,015 | 12/1969 | Boester | 210/12 |
| 3,697,417 | 10/1972 | Teletzke et al. | 210/609 |

(List continued on next page.)

FOREIGN PATENT DOCUMENTS

| | | |
|---|---|---|
| 672780 | 12/1989 | China . |
| 0179234 | 4/1986 | Germany . |
| 909872 | 4/1961 | United Kingdom . |

OTHER PUBLICATIONS

Sludge Treatment, WRc Investigates Multi–Stage Sludge Digestion, by Rod Palfrey, Feb., 1992, pp. 43–47.

Water Environment & Technology, Sludge Stabilization, Effects of Aerobic Thermophilic Pretreatment, by Urs Baier and Hans Peter Swiefellhofer, Jan., 1991, pp. 57–61.

Envirex, Watewater Treatment Equipment and Processes, Bulletin 315–24A, DuoTherm, pp. 1–4.

Bulletin ATP–594–2.5M The Walker Aerotherm System, CBI Walker, Inc. Aerobic Thermophilic Pretreatment, Copyright 1994.

(List continued on next page.)

*Primary Examiner*—Christopher Atkinson
*Attorney, Agent, or Firm*—Michael Best & Friedrich LLP

[57] ABSTRACT

The present invention includes a method, an apparatus, and a system for the treatment of waste. The method includes the steps of providing a cold waste solids tank that has a cold solids batch therein. The cold solids batch is transferred, after being warmed, from the cold waste solids tank to a thermal conditioning tank for thermal conditioning. A hot waste solids tank remote from the cold waste solids tank is also provided. The cold waste solids tank is filled with a new cold solids batch. The new cold solids batch is pumped from the cold waste solids tank through a heat exchanger, the partially cooled hot waste solids batch is simultaneously pumped from the hot waste solids tank through the heat exchanger. Heat is transferred from the partially cooled hot waste solids batch to the new cold solids batch in the heat exchanger to obtain a pre-warmed solids batch and to obtain a cooled solids batch. The cooled solids batch is discharged from the hot waste solids tank. Additional conditioned hot waste solids from the thermal conditioning tank are transferred to the hot waste solids tank to obtain a subsequent conditioned hot waste solids batch. The pre-warmed solids batch is pumped from the cold waste solids tank through the heat exchanger, and the subsequent hot waste solids batch is pumped from the hot waste solids tank through the heat exchanger. Heat is transferred from the subsequent hot waste solids batch to the pre- warmed solids batch in the heat exchanger to obtain a warmed solids batch and to obtain a subsequent partially cooled solids batch. The fully warmed solids batch is transferred to the thermal conditioning tank. The partially cooled solids batch heats a new cold solids batch to obtain on new pre-warmed solids batch. The subsequent cooled solids batch is transferred from the hot waste solids tank to the anaerobic digester where the fully cooled solids batch is anaerobically digested. The apparatus has a mode of operation that mirrors the method steps described above.

24 Claims, 4 Drawing Sheets

U.S. PATENT DOCUMENTS

| | | | |
|---|---|---|---|
| 3,742,188 | 6/1973 | Sundbye | 165/108 X |
| 3,791,351 | 2/1974 | Kent | 165/108 X |
| 3,838,199 | 9/1974 | Coe et al. | 426/55 |
| 3,913,500 | 10/1975 | Paccione et al. | |
| 3,920,068 | 11/1975 | Walsh et al. | 165/143 |
| 3,959,125 | 5/1976 | Teletzke | 210/10 |
| 3,972,811 | 8/1976 | Larkins, Jr. et al. | 210/71 |
| 4,140,150 | 2/1979 | Rundell | 165/154 X |
| 4,210,199 | 7/1980 | Doucette et al. | 165/143 X |
| 4,493,770 | 1/1985 | Moilliet | 210/603 |
| 4,511,370 | 4/1985 | Hunzinker et al. | 48/197 |
| 4,557,322 | 12/1985 | Nipple | 165/154 X |
| 4,975,195 | 12/1990 | Urbani | 210/608 |
| 4,993,483 | 2/1991 | Harris | 165/104.11 X |
| 5,063,994 | 11/1991 | Verkaart | 165/154 |
| 5,174,369 | 12/1992 | Glass | 165/154 |
| 5,207,911 | 5/1993 | Pellegrin et al. | 210/603 |
| 5,375,654 | 12/1994 | Hougland et al. | 165/154 X |
| 5,511,384 | 4/1996 | Likitcheva | 165/154 X |

OTHER PUBLICATIONS

Sludge Processing—Sturgeon Bay Adopts Biosolids Beneficial Reuse Strategy; Author Howard Hinterthuer; Jan. 1998 Issue Water/Engineering & Management, pp. 20–23.

Alfa–Laval American Heat Sludge Spiral Heat Exchangers, Allan Engineering Company, Inc. Catalog SA 1600 6/82 HR 3M.

Chapter 9. Thermophilic Pre–Stage Process EPA/625/10–90/007 Sep. 1990, pp. 57–62.

Alpha–Biotherm—Coverting Sewage Sludge Into Premium Agricultural Compost and Fertilizer, Alpha Environment Technology Ltd.

| TABLE 1 [1] | | | | | | | | |
|---|---|---|---|---|---|---|---|---|
| | TEST 1 | | TEST 2 | | TEST 3 | | TEST 4 | |
| | INFLUENT | EFF. | INFLUENT | EFF. | INFLUENT | EFF. | INFLUENT | EFF. |
| COLIFORM MPN/g | 9.45X10^6 | 870 | 1.82X10^7 | 870 | 1.00X10^7 | 480 | 9.86X10^6 | 480 |
| sCOD, mg/l | 2,950 | 8,850 | 3,440 | 8,840 | 5,440 | 14,500 | 5,090 | 16,700 |
| sNH$_3$, mg/l | 110 | 110 | 140 | 100 | 170 | 170 | 140 | 180 |
| sTKN, mg/l | 180 | 790 | 250 | 780 | 370 | 1,250 | 320 | 1,340 |
| TS (%) | 2.15 | 2.28 | 2.34 | 2.57 | 4.47 | 4.81 | 4.53 | 4.91 |
| TDS, mg/l | 1,710 | 4,658 | 2,050 | 4,510 | 3,510 | 9,120 | 3,240 | 9,780 |
| TSS, mg/l | 23,000 | 21,700 | 24,000 | 22,800 | 42,200 | 41,000 | 35,000 | 37,500 |
| TVSS, mg/l | 88 | 88.2 | 88.8 | 88 | 88.7 | 86.4 | 86.2 | 88 |

| TABLE 2 [1] | | |
|---|---|---|
| AVERAGED RESULTS | | |
| | INFLUENT | EFF. |
| COLIFORM MPN/g | 11.9X10^6 | 675 |
| sCOD, mg/l | 4,230 | 12,200 |
| sNH$_3$, mg/l | 140 | 140 |
| sTKN, mg/l | 280 | 1,040 |

| TABLE 3 [1] | | | |
|---|---|---|---|
| TEST NUMBER | Δ sCOD mg/l | Δ sTKN mg/l | Δ sTKN/ Δ sCOD |
| TEST 1 | 5,900 | 610 | 10.3 % |
| TEST 2 | 5,400 | 530 | 9.8 % |
| TEST 3 | 9,060 | 880 | 9.7 % |
| TEST 4 | 11,610 | 1,020 | 8.8 % |

1) ALL TESTS WERE CONDUCTED AT 150° F FOR ONE HOUR

TABLE 4

| | ANAEROBIC DIGESTION AT 95° F | THERMAL CONDITIONING AT 150° F FOLLOWED BY ANAEROBIC DIGESTION AT 95° F |
|---|---|---|
| TOTAL CONVECTIVE HEAT LOSS | 0.16 MBtu/hr | 0.16 MBtu/hr |
| INCOMING SOLIDS | 0.76 MBtu/hr | 1.53 MBtu/hr |
| HEAT RECOVERED | 0.0 Btu/hr | 0.77 MBtu/hr |
| AVERAGED RESULTS | 0.92 MBtu/hr | 0.92 MBtu/hr |

PROCESS AND APPARATUS FOR TREATING WASTE

BACKGROUND OF THE INVENTION

This invention generally relates to a process for the treatment and disposal of waste including but not limited to sewage sludge (waste solids). The invention particularly relates to a method and apparatus for reliably and economically converting waste into biosolids, including Class A biosolids.

Waste and sewage sludge includes organic matter, moisture and nutrients that can be beneficial when returned to agricultural land. However, in its untreated form, waste and sewage sludge is unacceptable for land disposal. Untreated sewage sludge contains pathogenic organisms that are harmful to animals and man.

Known methods of processing sewage sludge involve thermal conditioning in such a manner as to improve the dewaterability of the sludge so that the solid and liquid phases are readily separated, as by sedimentation, filtration, and centrifugation. The solid and liquid phases are then disposed of or subjected to further treatment separately (Teletzke et al. U.S. Pat. No. 3,256,179; Teletzke et al. U.S. Pat. No. 3,697,417; Erickson et al. U.S. Pat. No. 3,824,186). Other methods have been used to obtain heat by the biological decomposition of organic substances (Moillet, U.S. Pat. No. 4,493,770), and to treat sludge by sterilization (Teletzke, U.S. Pat. No. 3,959,125).

Various methods and systems have been proposed to recycle sewage sludge to obtain useful materials, heat energy, or methane gas. Usually, the methods utilize an apparatus which includes an aeration container having a bottom wall to which an aeration apparatus is connected which introduces fresh air to sludge or biological refuse.

Sludge is introduced into an aerobic thermophilic pre-treatment digester where the waste solids are disinfected and preconditioned. The heat recovery portion of these systems may employ mechanical mixers in complex hot solids waste chambers that are disposed inside larger vessels. These heat recovery systems are very complex and, hence, expensive to manufacture and operate. The mechanical mixers have the further drawback of becoming clogged overtime. As the mixers become clogged or as sludge scale coats the walls of the chambers, it becomes necessary to disassemble and clean the chambers or vessels to restore adequate heat transfer efficiency. Disassembly shuts down the whole system.

Another problem with known systems results from the use of mechanical stirrers located within pre-treatment digesters. These mechanical stirrers also become clogged over time and require costly expensive maintenance. The pre-treatment digesters also have the drawback of requiring the costly introduction of air. Another shortcoming of the introduction of air into the pre-treatment digesters is that noxious odors are released from the pre-treatment digesters due to the introduction and contamination of air introduced therein.

Yet another shortcoming of known systems includes the use of costly water jackets that surround the pre-treatment digesters. These water jackets are complex and increase the cost of the pre-treatment digesters substantially. Further, maintenance of the water jackets is made difficult by the fact that they are usually permanently connected to the pre-treatment digesters to achieve efficient heat transfer.

Thus, there exists a need to solve the problems in the art that are articulated above. It is an object of the invention to solve these problems.

SUMMARY OF THE INVENTION

Accordingly, it is an object of the invention to overcome the shortcomings of the prior art by providing a method of treating waste. The method includes the steps of providing a cold waste solids tank, a hot waste solids tank, and thermally conditioning the waste solids in a thermal conditioning tank at an effective thermal conditioning temperature and for an effective period of time to obtain conditioned waste solids. A hot waste solids tank is provided remote from the cold waste solids tank and the conditioned hot waste solids are transferred from the thermal conditioning tank to the hot waste solids tank to obtain a conditioned hot waste solids batch.

A pump transfers a cold solids batch from the cold waste solids tank through a heat exchanger while another pump transfers a partially cooled hot waste solids batch from the hot waste solids tank through the heat exchanger to transfer heat from the partially cooled hot waste solids batch to the cold solids batch in the heat exchanger thereby heating the cold solids batch and obtaining a pre-warmed solids batch and to cool the hot waste solids batch to obtain a cooled solids batch.

The cooled solids batch is discharged from the hot waste solids tank. The conditioned hot waste solids are transferred from the thermal conditioning tank to the hot waste solids tank to obtain a subsequent conditioned hot waste solids batch. Pumps pump the pre-warmed solids batch from the cold waste solids tank through the heat exchanger and pump the subsequent conditioned hot waste solids batch from the hot waste solids tank through the heat exchanger to transfer heat from the subsequent hot waste solids batch to the pre-warmed solids batch in the heat exchanger to obtain a warmed solids batch and to obtain a subsequent partially cooled solids batch. The warmed solids batch is transferred from the cold waste solids tank to the thermal conditioning tank, and the subsequent partially cooled solids batch is used to pre-warm a new cold solids batch.

It is another object of this invention to provide an apparatus for treating waste. The apparatus includes a cold waste solids tank for retaining a cold solids batch therein, and a thermal conditioning tank separate from and remotely located from the cold waste solids tank. The cold solids batch is transferred from the cold waste solids tank to the thermal conditioning tank. A thermal conditioner maintains an effective thermal conditioning temperature in the thermal conditioning tank. A hot waste solids tank separate from the cold waste solids tank and the thermal conditioning tank stores a batch of conditioned hot waste solids.

A heat exchanger is remotely located from and is connected to the cold waste solids tank and the hot waste solids tank. A pump, and pipe and valve network transfers the cold solids batch, and the pre-warmed solids batch from the cold waste solids tank through the heat exchanger. A separate pump and valve network transfer the hot waste solids batch and the partially cooled solids batch from the hot waste solids tank through the heat exchanger. An anaerobic digester is also connected to the hot waste solids tank by a pump, and pipe and valve network transfer cooled hot solids batch from the hot waste solids tank to the anaerobic digester.

It is yet another object of the invention to provide a tube-in-tube heat exchanger that can be used in an apparatus to treat waste.

The objects and features of the present invention, other than those specifically set forth above, will become apparent in the detailed description of the invention set forth below and in the drawings.

DETAILED DESCRIPTION OF THE INVENTION

Figure 1:
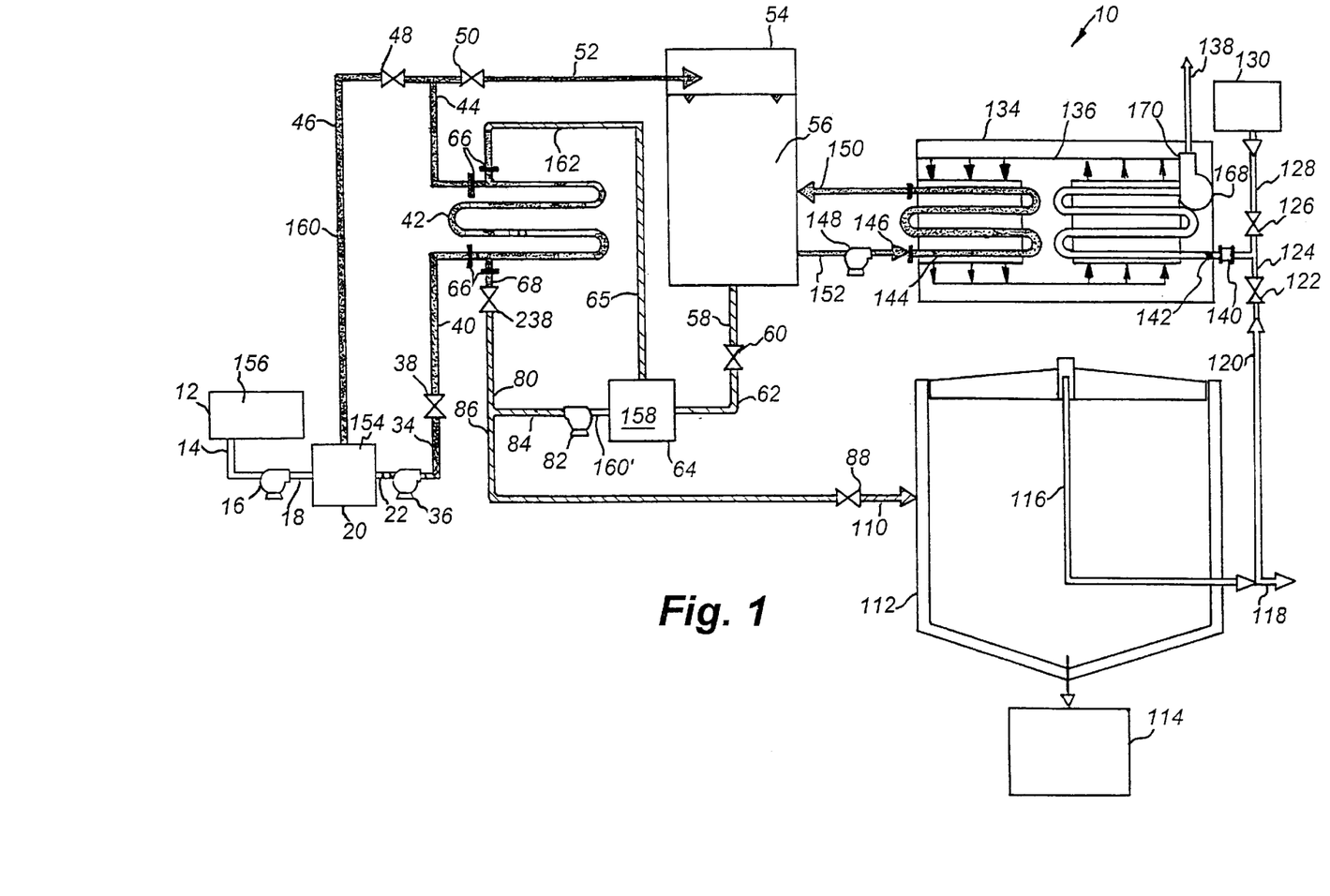
FIG. 1 is a schematic representation of an apparatus for treating waste which uses the process according to the present invention.

FIG. 1 is a schematic representation of apparatus 10 for treating waste. Apparatus 10 includes cold waste solids tank 20 for retaining cold solids batch 154, and new cold solids batch 156 and pre-warmed solids batch 160. Cold solids batch(es) 156 are transferred from thickener or storage tank 12 by way of conduit 14 (a pipe or channel) to pump 16 which pumps batch(es) 156 into cold waste solids tank 20. Cold waste solids tank 20 is attached to conduit 46 (a pipe or channel). Conduit 46 has valve 48 connected to tee 44. Tee 44 is connected to valve 50 which is attached to pipe or conduit 52. Conduit 52 is connected to thermal conditioning tank 54. Thermal conditioning tank 54 is separated from and remotely located from cold waste solids tank 20. Pipe 46, valve 48, tee 44, valve 50 and pipe 52 are used to transfer cold solids batch 154, and new cold solids batch 156, and (pre-warmed) solids batch 160 from heat exchanger 42 to cold waste solids tank 20 during operation of apparatus 10. Pipe 22 is connected to pump 36. Pump 36 is connected to pipe 34. Pipe 34 is connected to valve 38. Valve 38 is connected to pipe 40. Pipe 40 is connected to heat exchanger 42 at coupling 66.

During an optional start-up procedure, cold waste solids batch 154, water, or some other suitable start up material is transferred to thermal conditioning tank 54. It is also possible to substitute an initial batch of water or some other suitable material for the start-up procedure. During this mode of operation the start up material, travels from cold waste solids tank 20 through pipe 22. Valves 38 and 50 are in an open position, and valve 48 is in a closed position. Cold waste solids batch 154 is then pumped by pump 36 through pipe 34, valve 38, pipe 40, coupling 66, heat exchanger 42, coupling 66, tee 44, valve 50 and pipe 52 into thermal conditioning tank 54. In a variant, water or some other suitable material is directly transfered from a source to thermal conditioning tank 54.

In a re-circulating mode of operation of apparatus 10, cold waste solids batch 154 or (pre-warmed) solids batch 160 is re-circulated. Valve 50 is in a closed position. Valves 38 and 48 are in an open position. During this mode of operation, cold waste solids batch 154 or solids batch 160 travels from cold waste solids tank 20 through pipe 22. Valves 38 and 48 are in an open position, and valve 50 is in a closed position. Cold waste solids batch 154 or solids batch 160 is then pumped by pump 36 through pipe 34, valve 38, pipe 40, coupling 66, heat exchanger 42, coupling 66, tee 44, valve 48, pipe 46 into cold waste solids tank 20. The cycle is repeated and cold waste solids batch 154 or solids batch 160 travels through the circuit described above repeatedly.

Thermal conditioning tank 54 is connected to thermal conditioner 134 by way of egress pipe 152. Egress pipe 152 is connected to pump 148 which pumps conditioned hot waste solids 56 (and other solids in tank 54) through pipe 146 to thermal conditioner 134. Thermal conditioner 134 warms cold solids batch 154 or other solids located in thermal conditioning tank 54 to an effective thermal conditioning temperature and for an effective period of time. After the conditioning process, colds solids batch 154 or other solids in thermal conditioning tank 54 become conditioned hot waste solids 56. Conditioned hot waste solids 56 are substantially pathogen free.

Thermal conditioning tank 54 is connected to hot waste solids tank 64 by pipe 58, valve 60, and pipe 62. Hot waste solids tank 64 is separate from cold waste solids tank 20 and thermal conditioning tank 54. It is appreciated that separation of cold waste solids tank 20, from hot waste solids tank 64, and from thermal conditioning tank 54 allows for simplified construction of thermal conditioning tank 54 and for ease of maintenance and replacement of tanks 20, 54, and 64 due to regular usage of the tanks.

Valve 60 in cooperation with an optional pump (not shown) provides for the batch transfer of conditioned hot waste solids 56 from thermal conditioning tank 54 to hot waste solids tank 20. The batch transfer of conditioned hot waste solids 56 from thermal conditioning tank 54 to hot waste solids tank 64 is used to obtain conditioned hot waste solids batch 158 that will be used to transfer heat to pre-warmed solids batch 160.

Thickener or storage 12 is used to store a plurality of new cold solids batches 156 until needed. Cold waste solids tank 20 is filled with a single cold solids batch 154 by way of pipe 14, pump 16, and pipe 18 which provide filling means to fill cold waste solids tank 20 with a cold solids batch 154.

Cold waste solids tank 20 is connected to pipe 22. Pipe 22 is connected to pump 36 which is connected to valve 38. Valve 38 is connected to pipe 40. Pipe 40 is connected to one end of heat exchanger 42 at coupling 66. At the other end of heat exchanger 42, tee 44 is connected to coupling 66. Tee 44 is connected to valve 48 which is connected to pipe 46. The pipe and valve network provides for solids return to cold waste solids tank 20.

Heat exchanger 42 is remotely located from and connected to cold waste solids tank 20 and hot waste solids tank 64 by the pipe and valve network described herein. Hot waste solids tank 64 is connected to heat exchanger 42 with optional connecting pipe 160' which is connected to pump 82. Pump 82 is connected to pipe 80. On one end of pipe 80 is connected to valve 238. Valve 238 is connected to optional pipe segment 68. Pipe segment 68 is connected to coupling 66 which is connected to heat exchanger 42.

It is appreciated that the externalization of heat exchanger 42 from thermal conditioning tank 54, cold waste solids tank 20 and hot waste solids tank 64 provides for ease of maintenance of heat exchanger 42 and each of the respective tanks 20, 54 and 64. There is a significant decrease in the cost of manufacture and complexity of thermal conditioning tank 54 where heat exchanger 42 is externalized therefrom. Thermal conditioning tank 54 does not require the introduction of air into the thermal conditioning tank 54 during operation thereof. It is also appreciated that greater efficiencies are obtained in the transfer of heat from hot waste solids batch 158 to pre-warmed solids batch 160 to obtain a fully warmed solids batch 160 using externalized heat exchanger 42. Hot waste solids batch 158 becomes partially cooled solids batch 162. Further, direct heat exchange from partially cooled solids batch 162 to cold solids batch 154 and from partially cooled solids batch 162 to cold solids batch 154 also increases heat transfer efficiency since an intermediate medium such as water is not used.

Heat exchanger 42 transfers heat from hot waste solids batch 158 (directly transferred from thermal conditioning tank 54) to pre-warmed, solids batch 160. Once heat has been transferred from hot waste solids batch 158 to pre-warmed, solids batch 160, pre-warmed solids batch 160 becomes warmed solids batch 160, and hot waste solids batch 158 has been cooled to obtain partially cooled solids batch 162. During pre-warming and warming of solids batch 160, valve 38 is in an open position, valve 50 is in a closed position, and valve 48 is in an open position. During cooling of hot waste solids batch 158 (after transfer of hot waste solids batch 158 from thermal conditioning tank 54 to hot waste solids tank 64) and further cooling of cooled solids batch 162, valve 60 is in a closed position, valve 88 is in a closed position, and valve 238 is in an open position. Pump 36 in cooperation with pipe 34, valve 38, and pipe 40 pumps cold solids batch 154 or solids batch 160 (depending on the point in the cycle described herein) from cold waste solids tank 20 through heat exchanger 42. Cold solids batch 154 is warmed in heat exchanger 42 by heat transfer from cooled solids waste batch 162. Solids batch 160 (pre-warmed cold solids batch 154) then proceeds through tee 44 (valve 50 is now in a closed position), valve 48, and pipe 46 to return to cold waste solids tank 20. Several cycles through the heat exchanger are provided. The hot waste solids tank 64 is drained. A subsequent hot waste solids batch 158 is pumped into hot waste solids tank 64 from thermal conditioning tank 54.

Concurrently, pump 82 in cooperation with pipe 84, pipe 80 (valve 88 is in a closed position), valve 238 and optional pipe 68 transfer hot waste solids batch 158 from hot waste solids tank 64 through heat exchanger 42. Hot waste solids batch 158 is cooled in heat exchanger 42 by transfer of heat to pre-warmed solids batch 160. Hot waste solids batch 158 cools and becomes partially cooled solids batch 162. Partially cooled solids batch 162 then proceeds through pipe 65 and returns to hot waste solids tank 64. It is appreciated that pre-warmed solids batch 160 and hot waste solids batch 158 can continuously circulate and re-circulate through heat exchanger 42 several times. In a variant of the invention, the object of the re-circulation is to obtain a temperature of solids batch 160 that is substantially equal to the temperature of cooled solids batch 162.

The temperatures of solids fully warmed batch 160 and fully cooled solids batch 162 have substantially equalized through heat exchange in heat exchanger 42 in one variant of the invention of the normal mode of operation. In the normal mode of operation, there is efficient heat transfer due to the "staggered" heat recovery process described herein which provides a substantial temperature difference and thus a heat transfer driving force in the situation where the temperatures don't equalize. Cold solids batch 154 can be at room temperature, at an out doors temperature, or in the range of about 40 degrees Farenheit to about 70 degrees Farenheit. A single cold solids batch has been heated by two independent batches of conditioned hot waste solids 56, e.g. a partially cooled solids batch 162 and hot waste solids batch 158. Once, solids batch 160 has increased in temperature through heat exchange in heat exchanger 42, valve 48 is closed and valve 38 remains in an open position. Plump 36 in cooperation with pipe 22, pipe 34, valve 38, pipe 40, heat exchanger 42, tee 44, valve 50 (which is now in an open position), and pipe 52, pumps the twice heated solids batch 160 into thermal conditioning tank 54 and thus accomplishes the transfer of solids batch 160 to thermal conditioning tank 54.

Partially cooled solids batch 162 transfers heat to cold waste solids batch 154 to obtain a pre-warmed solids batch 160. Hot waste solids batch 158 transfers heat to pre-warmed, solids batch 160. Once a single batch of conditioned hot waste solids has transferred heat to a pre-warmed solids batch 160 (to obtain a warmed solids batch 160 which is transferred to thermal conditioning tank 54) and to a cold solids batch 154 (thus having most of its exchangeable heat exchanged with the solids waiting to enter thermal conditioning tank 54), valve 238 is closed, valve 60 is closed, and valve 88 is opened.

Anaerobic digester 112 is connected to hot waste solids tank 64 by optional pipe 160, pump 82, pipe 84, valve 88 and optional pipe 110. Cooled solids batch 162 is transferred from hot waste solids tank 64 by pump 82 to anaerobic digester 112. It is appreciated that anaerobic digester 112 is located remotely from tanks, 20, 54 and 64. It is contemplated that anaerobic digester 112 can be geographically remote from tanks 20, 54 and 64.

Figure 2:
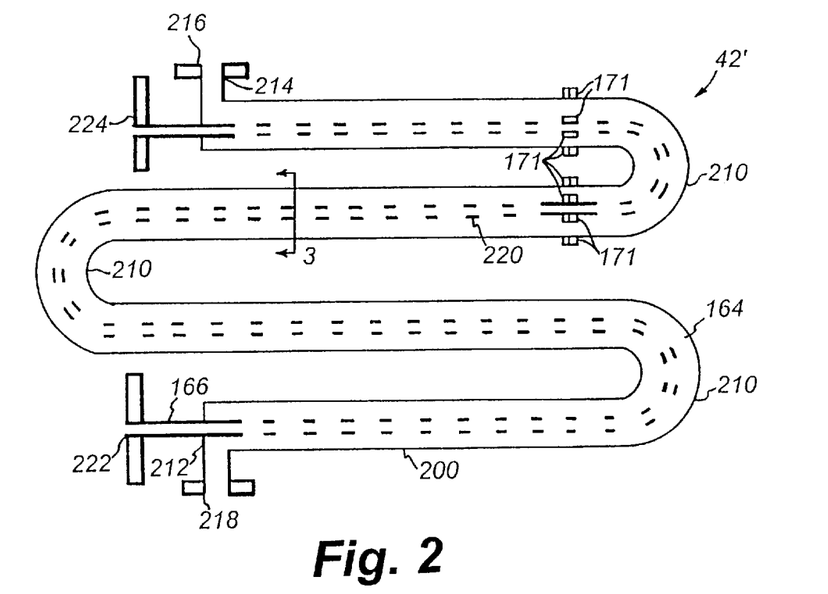
FIG. 2 is a top plan view of the heat exchanger illustrated in FIG. 1.

As illustrated in FIG. 2, preferably, heat exchanger 42 includes a removable tube-in-tube heat exchanger 42'. Tube-in-tube heat exchanger 42' has separate channels 164, 166. Channel 164 conducts new cold solids batch 154 or pre-warmed solids batch 160. Channel 166 conducts hot waste solids batch 158 or partially cooled solids batch 162 through heat exchanger 42' in one embodiment. In yet another embodiment thereof, channel 166 conducts new cold solids batch 154 and channel 164 conducts hot waste solids batch 158 through heat exchanger 42'. Heat exchanger 42' is readily removable from apparatus 10 since it is externalized from thermal conditioning tank 54, cold waste solids tank 20, and hot waste solids tank 64. Couplings 66 provide for ready detachment of heat exchanger 42, 42' from tee 44, pipe 65, pipe segment 68 and pipe 40.

It is appreciated that outer tube has a diameter in the range of about six to eight inches and inner tube has a diameter in the range of about three to about five inches. It is appreciated that the diameters of inner and outer tubes 200, 220 can be larger than those described or smaller than those described depending on the apparatus 10 that is used. The diameters of inner and outer tubes 200, 220 can be determined as per the needs of the system in generally.

Apparatus 10 also includes a control system (e.g. a computer and routines, or mechanical control) that provides for the continuous re-circulation of cold solids batch 154 or pre-warmed solids batch 160 through heat exchanger 42, 42'; and, conditioned hot waste solids batch 158 or pre-cooled and cooled solids batch 162 through separate channels 164, 166 in tube-in-tube heat exchanger 42' to increase transfer heat from hot waste solids batch 158 to pre-warmed solids batch 160, and, from pre-cooled solids batch 162 to cold solids batch 154. A portion of the control system also includes a routine or mechanical control for controlling the filling of thermal conditioning tank 54 with warmed solids batch 160 to no more than about ⅙th of thermal preconditioning tank's 54 total volume.

Thermal conditioning tank 54 is connected to thermal conditioner 134 by egress pipe 152, pump 148, optional pipe 146, and return pipe 150. Thermal conditioner 134 includes thermal conducting tube 144. After cold solids batch 154, new colds solids batch 156, and/or warmed solids batch 160 are fed into thermal conditioning tank 54, batch(es) 154, 156, 160 are warmed by thermal conditioner 134 to a temperature of about 150° Fahrenheit or other appropriate temperature to reduce pathogens in batch(es) 154, 156, 160. Batch(es) 154, 156, 160 are now considered conditioned hot waste solids 56. All of the solids (including cold solids batch 154, new cold solids batch 156, solids batch 160, and conditioned hot waste solids 56) in thermal conditioning tank 54 are transferred by way of optional pipe 152 to pump 148. Pump 148 pumps the solids through optional pipe 146, thermal conducting tube 144, and return pipe 150 back into thermal conditioning tank 54. It is appreciated that use of pump 148, pipes 152, 146, 150 and thermal conditioner 134 that includes a heater/heat exchanger greatly increases the efficiency of thermally conditioning the solids in tank 54, greatly reduces the cost of manufacture of thermal conditioning tank 54, and greatly reduces the cost of maintenance of thermal conditioning tank 54. The interior of thermal conditioning tank 54 is free of mechanical agitation means that have problems associated therewith of poor mixing and high maintenance over time.

Thermal conditioner 134 includes a heater/heat exchanger that is located externally of thermal conditioning tank 54 and separate therefrom. Pumping solids from thermal conditioning tank 54 keep the solids in thermal conditioning tank 54 mixed without the problems associated with conventional mechanical agitators that are disposed in the interior of thermal conditioning tanks. Preferably, thermal conditioner 134 is controlled by the control system of apparatus 10 and includes means for continuously recirculating the solids in thermal conditioning tank 54 through thermal conditioner 134 (combination heater/heat exchanger). In a variant, thermal conditioner 134 is readily detachable from pipes 146, 150 and connector 140. Since thermal conditioner 134 is externally located from thermal conditioning tank 54 and readily detachable from pipes 146, 150 it is appreciated that maintenance of both thermal conditioning tank 54 and thermal conditioner 134 is facilitated and down time is reduced.

Thermal conditioner 134 includes heater 168. Heater 168 heats water which circulates through water recirculator 136. Water recirculator 136 transfers heat from the water in the water recirculator 136 to thermal conducting tube 144 and the contents thereof. The solids in thermal conducting tube 144 are then heated to an effective temperature.

An effective temperature is generally in the range of about 148 degrees Farenheit to about 160 degrees Farenheit for waste having solids of about less than seven weight percent. Other effective temperatures are determined empirically. Effective periods of time are a function of the effective temperature selected. Exemplary temperatures and times are as follows: 148 degrees Farenheit—68.5 minutes; 150 degrees Farenheit—48.9 minutes; and, 160 degrees Farenheit—7.99 minutes. Effective time periods and temperatures are also selected to effect waste solubilization.

Heater 168 is powered by methane gas generated in anaerobic digester 112 and piped to heater 168 through pipe means 116, pipe 120, valve 122, tee 124, connector 140, and optional gas conducting, multiple bend tube 142. Excess gas is released at vent 118. Heater 168 is also optionally powered by auxiliary gas source 130. Valve 126 may be in a closed position where heater 168 is powered by methane gas generated in anaerobic digester 112. Anaerobic digester 112 is connected to digested solids dewatering apparatus 114 or optionally disposed of in a conventional manner.

Auxiliary gas source 130 feeds methane gas (or other appropriate fuel) through pipe 128, valve 126 (valve 122 is in a closed position), tee 124, connector 140 and, optional gas conducting, multiple bend tube 142 into heater 168. It is appreciated that heat may also be directly passed from gas conducting, multiple bend tube 142 to water recirculator 136 to heat the water in water recirculator 136. Exhausts are vented from heater 168 at vent 138. Exhaust fan 170 aids in drawing in the digester gas or auxiliary fuel as well as air for combustion.

Pump 148 is used to continuously recirculate the solids in thermal conditioning tank 54 through thermal conditioner 134 to keep the solids in thermal conditioning tank 54 thoroughly mixed. Thorough mixing of the solids in tank 54 insures that the solids are kept at a substantially uniform temperature throughout the tank. Keeping the solids at a substantially uniform temperature assists in reducing pathogens in the solids in thermal conditioning tank 54. It is also appreciated that it is not necessary to simultaneously maintain the viability of a microbiological population for solids degradation in thermal conditioning tank 54 during the thermal conditioning process, and as such no air or oxygen is provided to thermal conditioning tank 54.

Apparatus 10 enables a method of treating waste. The method of treating waste includes the steps of providing cold waste solids tank 20. Cold waste solids tank 20 is filled with one or more cold solids batch(es) 154 from storage tank 12 by way of pipe 14, pump 16 and pipe 18. Cold waste solids tank 20 has equal volume of hot waste solids tank 64. Upon start up of apparatus 10, valve 48 is in a closed position and valves 38 and 50 are in open positions. One or more cold solids batch(es) 154 are transferred from cold waste solids tank 20 to thermal conditioning tank 54.

In thermal conditioning tank 54, one or more cold solids batch(es) 154 are thermally conditioning at an effective thermal conditioning temperature and for an effective period of time to obtain conditioned hot waste solids 56. The thermal conditioner 134 is activated for thermal conditioning of the one or more cold solids batch(es) 154, and the cold solids batch(es) 154 are heated to the effective thermal conditioning temperatures. An effective thermal conditioning temperature has been determined to be about 150° F. for an effective period of time. The effective period of time is about one hour. Other effective thermal conditioning temperature and time ranges are determined empirically.

The method of treating waste further includes the step of providing hot waste solids tank 64 which is remote from cold waste solids tank 20. Conditioned hot waste solids 56 are transferred in batch from thermal conditioning tank 54 to hot waste solids tank 64 to obtain conditioned hot waste solids batch 158 in hot waste solids tank 64. During transfer of conditioned hot waste solids 56 from thermal conditioning tank 54 to hot waste solids tank 64, valve 62 is in an open position. Conditioned hot waste solids can be transferred to hot waste solids tank 64 by gravity or by an optional pump (not shown). After transfer of hot waste solids batch 158 from thermal conditioning tank 54 to hot waste solids tank 64, valve 60 is closed.

After filling thermal conditioning tank 54 with one or more cold waste solids batch(es) 154, valve 50 is closed. In the normal mode of operation of apparatus 10, only one batch of solids enters the thermal conditioning tank 54. The volatile content of new cold solids batch 156 is optionally analyzed at this juncture.

Cold solids batch 154 has been pre-warmed by heat exchange with partially cooled waste solids batch 162 in heat exchanger 42 to obtain pre-warmed solids batch 160. The twice cooled hot waste solids batch 162 is discarded at this point and can be pumped to digester 112. A new hot waste solids batch 158 is transferred to hot waste solids tank 64 from thermal conditioning tank 54 (Valve 60 is opened. Tank 64 is filled. Valve 60 is closed.)

Valves 38 and 48 are now in an open position. Pre-warmed solids batch 160 is pumped from cold waste solids tank 20 through heat exchanger 42 by pump 36 in cooperation with related pipes 22, 34, 40, 46, tee 44, and valves 38 and 48 as described herein.

Valves 50, 60 and 88 are in a closed position. Valve 238 is in an open position. At the same time as pre-warmed solids bach 160 is pumped through heat exchanger 42, pump 82 is activated and pump 82 pumps hot waste solids batch 158 from hot waste solids tank 64 through heat exchanger 42, by way of related pipes 160, 84, 80, 68, 65 and valve 238. Hot waste solids batch 158 transfers heat to pre-warmed solids batch 160 in heat exchanger 42 and hot waste solids batch 158 becomes once cooled solids batch 162. Pre-warmed solids batch 160 is warmed to become warmed solids batch 160 by this heat transfer. It is appreciated that the solids batches 160, 158 circulate through heat exchanger 42 until the temperatures of each of the respective batches roughly equalizes in one variant of the invention.

Valve 48 is now closed, and valves 50 and 38 are in an open position. Pump 36 pumps the warmed solids 160 from cold waste solids tank 20 to thermal conditioning tank 54 by way of pipe 22, pump 36, pipe 34, valve 38, pipe 40, connector 66, heat exchanger 42, connector 66, tee 44, valve 50 and pipe 52. This concludes one cycle.

After cold waste solids tank 20 has been drained of warmed solids batch 160, valve 50 is closed and valves 48 and 38 are opened. Pump 16 pumps a new cold waste solids batch 154 from tank 12 into cold waste solids tank 20. Pump 36 now begins to circulate new cold waste solids batch 154 through heat exchanger 42.

In a standard mode of operation of the method described herein, valve 60 and valve 88 are closed. Valve 238 is now in an opened position so that once cooled solids batch 162 can be further processed and cooled further. Once cooled solids batch 162 is pumped by pump 82 through heat exchanger 42 to heat new cold solids batch 154 to obtain pre-warmed solids batch 160.

Cooled solids batch 162 now has exchanged heat with two independent batches of solids that have been retained in cold waste solids tank 154. Cooled solids batch 162 undergoes at least two heat transfering drops in temperature. Cooled solids batch 162 is now ready to be processed in digester 112. Cooled solids batch 162 is pumped by pump 82 through pipe 84 and through valve 88, which is in an open position, through optional pipe 110 into anaerobic digester 112. After cooled solids batch 162 is removed from hot waste solids tank 64, valve 60 is opened, valve 88 is closed, and a subsequent batch of conditioned hot waste solids 56 is fed into hot waste solids storage tank 64. Valve 38 is opened. Subsequent hot waste solids batch 158 transfers heat to pre-warmed solids batch 160 in heat exchanger 42 and hot waste solids batch 158 becomes initially cooled solids batch 162. Solids batch 160 further increases in temperature. It is appreciated that the solids batches 160, 158 continuously recirculate through heat exchanger 42 until the temperatures of each of the respective batches roughly equalizes in one variant of the invention.

The twice heated solids batch 160 is also now ready for discharge into thermal conditioning tank 54. Valve 48 is closed, and valves 50 and 38 are in an open position. Pump 36 pumps the twice heated solids batch 160 from cold waste solids tank 20 through pipe 34, valve 38, pipe 40, heat exchanger 42, tee 44, valve 50 and pipe 52 into thermal conditioning tank 54.

The method steps are now repeated again. An example of this method in practice is as follows:

EXAMPLE

Cold solids batch(es) 154 were transferred from cold waste solids tank 20 to thermal conditioning tank 54. Cold solids batch(es) 154 were heated to 150° Fahrenheit to obtain conditioned hot waste solids 56. The conditioned hot waste solids 56 were transferred in batch to hot waste solids tank 64.

Cold waste solids tank 20 has solids batch 160 therein which has been pre-warmed by heat transfer in heat exchanger 42 with a partially cooled hot waste solids batch 162. Solids batch 160 increased in heat from about 40° F. to about 63° F. during pre-warming thereof. A new subsequent hot waste solids batch 158 was transferred from thermal conditioning tank 54 to hot waste solids tank 64. The new subsequent hot waste solids batch 158 was at about 150° F. Pump 36 was actuated for pumping pre-warmed solids batch 160 from cold waste solids tank 20 through heat exchanger 42. Pump 82 was simultaneously actuated to pump hot waste solids batch 158 (newly transferred from thermal conditioning tank 54 to hot waste solids tank 64) from hot waste solids tank 64 through heat exchanger 42. Solids batch 160 was heated from 63° Fahrenheit to about 93° F. Hot waste solids batch 158 which was originally heated to 150° Fahrenheit now drops in temperature to 123° Fahrenheit and becomes once-cooled solids batch 162. The solids batch 160 is now fully warmed and transferred to thermal conditioning tank 54 from cold waste solids tank 20.

A new cold solids batch 154 was transferred to cold waste solids tank 20. Pump 36 was actuated for pumping solids batch 154 from cold waste solids tank 20 through heat exchanger 42. Pump 82 was simultaneously actuated to pump once, partially-cooled solids batch 162 (at 123° Fahrenheit) from hot waste solids tank 64 through heat exchanger 42 and achieve twice cooled solids batch 162 at 97 degrees Farenheit. Colds solids batch 154 is heated to about 63° Fahrenheit to become pre-warmed solids batch 160. Hot waste solids batch 158 has had available heat transferred therefrom and it is discharged from hot waste solids tank 64 as cooled batch 162. That is, hot waste solids batch 158 has had available heat transferred from hot waste solids batch 158 to at least two solids batches 154, 160, and is discharged from hot waste solids tank 64.

The cycle of refilling the hot waste solids tank 64 with hot waste solids batch 158 is repeated, and the temperature of pre-warmed solids batch 160 is increased by heat transfer in heat exchanger 42. Hot solids tank 64 is filled with a subsequent conditioned hot waste solids batch 158 from thermal conditioning tank 54. Pumps 82 and 36 are again actuated. Solids batch 160 is further heated to a temperature of about 93° Fahrenheit. The further warmed solids batch 160 is discharged to thermal conditioning tank 54. Cold waste solids tank 20 is again filled with new cold solids batch 156, and the steps described above are repeated.

The method includes the step of anaerobically digesting fully cooled solids batch 162 in anaerobic digester 112 to obtain stabilized solids. The stabilized solids are then transferred to digested solids dewatering apparatus 114 for further processing thereof or optionally disposed of as is conventional. The step of anaerobically digesting further optionally includes a reduction in volatile matter in the stabilized solids of about 80 percent to about 40 percent. In a preferred embodiment, the step of anaerobically digesting includes a reduction in volatile matter in the stabilized solids of about 40 percent. It is appreciated that fully cooled solids batch 162 can be periodically discharged from heat exchanger 42 and hot waste solids tank 64 to anaerobic digester 112 as required. The volatile content of the stabilized solids can be optionally analyzed at this juncture.

In the practice of the methods described herein, heat exchanger 42 includes removable tube-in-tube heat exchanger 42' as illustrated in FIG. 2. It is appreciated that tube-in-tube heat exchanger 42' allows for efficient rates of solids 154, 158, 160, 162 flow through and heat exchange. The methods described herein utilize continuous re-circulation of new cold solids batch 156, solids batch 160, hot waste solids batch 158 and batch 162 through separate channels 164, 166 in tube-in-tube heat exchanger 42' to increase transfer heat from warm or hot waste solids to cold or cooler waste solids.

Heat exchanger 42' is made to be used with apparatus 10 for treating waste. Heat exchanger 42' includes continuous tube 200. Continuous tube 200 has one or more 180 degree bends 210, and first end portion 212 and second end portion 214. Waste solids entry port connector 216 and waste solids exit port connector 218 are located at either end portion 212, 214 of continuous tube 200. Waste solid entry and exit port connectors 216, 218 are removably connectable to waste solids re-circulating supply means that includes either tee 44, pipe 40, pipe 65 or pipe segment 68.

Inner tube 220 is disposed inside continuous tube 200. Preferably, inner tube 220 is concentric with continuous tube 200. Inner tube 220 has inner tube entry port connector 222 and inner tube exit port connector 224 which are both accessible from the exterior of heat exchanger 42'. Port connectors 222, 224 allow for heat exchanger 42' to removably connect inner tube entry port connector 222 and inner tube exit port connector 224 to the waste solids re-circulating supply means described above. Inner tube 220 has a continuous tube wall which transfers heat between warmer waste solids 158, 162 and cooler waste solids 154, 160 when the solids continuously re-circulate through tubes 200, 220.

It is appreciated that inner tube 220 and outer tube 200 are constructed and sized to provide for unequal flow rates through each respective tube. The respective pumps are actuated to provide these unequal flow rates. Tube 220 is of a smaller diameter than tube 200. In a preferred embodiment, the diameter of tube 200 is about six (6) inches and the diameter of tube 220 is three (3) inches. In a variant, the diameter of tube 200 is about eight (8) inches and the diameter 220 is about five (5) inches.

The flow rates through tube 200 where the diameter of tube 200 is about six (6) inches are in the range of about 220 gallons per minute (gpm) to about 270 gpm hot or partially cooled solids. The flow rates through tube 220 where the diameter of tube 220 is about three (3) inches are in the range of about 70 gpm to about 120 gpm cold or partially warmed solids. In yet another variant, the flow rates through tube 200 where the diameter of tube 200 is about six (6) inches are about 240 gallons per minute (gpm) hot or partially cooled solids. The flow rates through tube 220 where the diameter of tube 220 is about three (3) inches are about 90 gpm cold or partially warmed solids.

The flow rates through tube 200 where the diameter of tube 200 is about eight (8) inches are in the range of about 300 gallons per minute (gpm) to about 350 gpm hot or partially cooled solids. The flow rates through tube 220 where the diameter of tube 220 is about five (5) inches are in the range of about 230 gpm to about 280 gpm cold or partially warmed solids. In yet another variant, the flow rates through tube 200 where the diameter of tube 200 is about eight (8) inches are about 320 gallons per minute (gpm) hot or partially cooled solids. The flow rates through tube 220 where the diameter of tube 220 is about five (5) inches are about 250 gpm cold or partially warmed solids. Tubes 200, 220 are generally constructed from carbon steel or stainless steel. Other suitable materials may also be employed. The unequal flow of solids through tubes 200, 220 is accomodated by re-circulation from and to each respective cold and hot waste solids tanks.

In one variant, it is further appreciated that bends 210 are generally cast from a metal and have bend connectors 171 connecting each respective bend 180 to the linear portion of each individual tubes 200, 220. Connectors 171 allow bends 210 to be removeably connected to the linear portions of tubes 200, 220 to facilitate servicing of a respective tube. Bends 210 are bolted to or secured by other means to heat exchanger 42' at connectors 171 to provide for ease of removal of a respective bend 210 for servicing of the interior of the tube 200, 220. One or more bends 210 may have connectors 171. It is appreciated that connectors 66 connecting tube 220 of heat exchanger 42' to the rest of apparatus 10 can be disconnected from the rest of apparatus 10 and serviced without interrupting or interfering with the flow of solids though tube 200. Similarly, connectors 66 can be disconnected so that tube 220 can be serviced without interrupting the flow of solids through tube 200. Servicing of tubes 200, 220 can be accomplished by rodding each respective tube.

In one variant of heat exchanger 42', continuous tube 200 is dimensioned and constructed to conduct hot waste solids through continuous tube 200, and inner tube 220 is dimensioned and constructed to conduct cold waste solids through inner tube 220. In a second variant of heat exchanger 42', continuous tube 200 is dimensioned and constructed to conduct cold waste solids through continuous tube 200, and inner tube 220 is dimensioned and constructed to conduct hot waste solids through inner tube 220. It is understood that continuous tube 200 and inner tube 220 are dimensioned to conduct hot waste solids through continuous tube 200 at a rate at which there is efficient transfer of heat from hot or warmer waste solids 158, 162 to cold or cooler waste solids 156, 160 to effect thermal pre-conditioning of cold or cooler waste solids 156, 160.

In the embodiment of FIG. 2, heat exchanger 42' includes continuous tube 200 that has at least three 180 degree bends 210. More bends 210 are provided as desired. Continuous tube 200 can also have an optional insulating jacket (not shown) surrounding continuous tube 200.

In general, the first stage of apparatus 10 generally includes low-temperature thermal conditioning without biological activity. The low temperature thermal conditioning takes place in thermal conditioning tank 54 with the assistance of thermal conditioner 134. It is appreciated that no air or oxygen is added to thermal conditioning tank 54 or thermal conditioner 134. Consequently, there are no odor control problems with this stage of the process.

The second stage of the process includes transfer of processed waste solids as described above to anaerobic digester 112 for solid stabilization. Solids that are waiting to enter the first stage of apparatus 10 have heat transferred thereto by the heat recovery system as described above that transfers heat between the hot, treated solids in the first stage and the cold, untreated solids waiting to enter the first stage. This apparatus transfers heat between the hot and cold solids with no intermediate transfer medium, such as water, between the heat exchange tubes as described above.

The first stage of the apparatus 10 requires no biological activity. The thermal conditioning at temperatures and for periods of time that are determined empirically in the first stage results in pathogen reduction as well as solubilization of solids. Temperatures and times are selected so as to obtain pathogen reduction without biological digestion. Hence, it is appreciated that the first stage of the apparatus 10 is greatly simplified and requires less user attention. The user need not monitor the process of the first stage or generally make operating adjustments to apparatus 10 to maintain the viability of a microbiological population for solids degradation. Generally, it is preferred that the operating temperature of the first stage be maintained at about 150° Fahrenheit for about 1 hour. The time and temperature requirements generally are dictated by those requirements necessary for pathogen reduction to meet Class A biosolids in U.S. government 503 regulations.

Once pathogens have been reduced to meet Class A criteria, the preconditioned, solubilized solids are stabilized in anaerobic digester 112. Anaerobic digester 112 involves a two step process. Stabilization is generally defined as an overall reduction of volatile matter in the solids of about 38 percent. This level of stabilization meets the criteria for Class A biosolids as specified in Option 1 of U.S. government 503 regulations. As described above, methane gas generated in the second stage is used to maintain the operating temperature of stage one. Hence, an optional outside fuel source is generally not required. Therefore, with respect to operating temperature, the process is autothermal.

A preferred batch size as described herein is about ⅛th or less than ⅛th the volume of thermal conditioning tank 54. The initial analysis of the volatile content is taken on the feed to stage one of the process and the final analysis for volatile content is taken on the discharge from stage two of the process. It is appreciated that this process provides low temperature thermal conditioning followed by anaerobic digestion. Low temperature thermal conditioning with heat recovery allows the process to be autothermal.

It is also appreciated that tube-in-tube heat exchanger 42' provides for heat recovery for solids in a multiple return, bend, tube and tube heat exchanger. Tube-in-tube heat exchanger transfers heat between hot, treated solids and cold, untreated solids in the first stage with no intermediate heat transfer medium. It is also appreciated that the method described herein provides for alternating heat transfer between new cold solids batch 156, solids batch 160, and/or one or more solids batch(es) 158, 162 as described herein.

Figure 4:
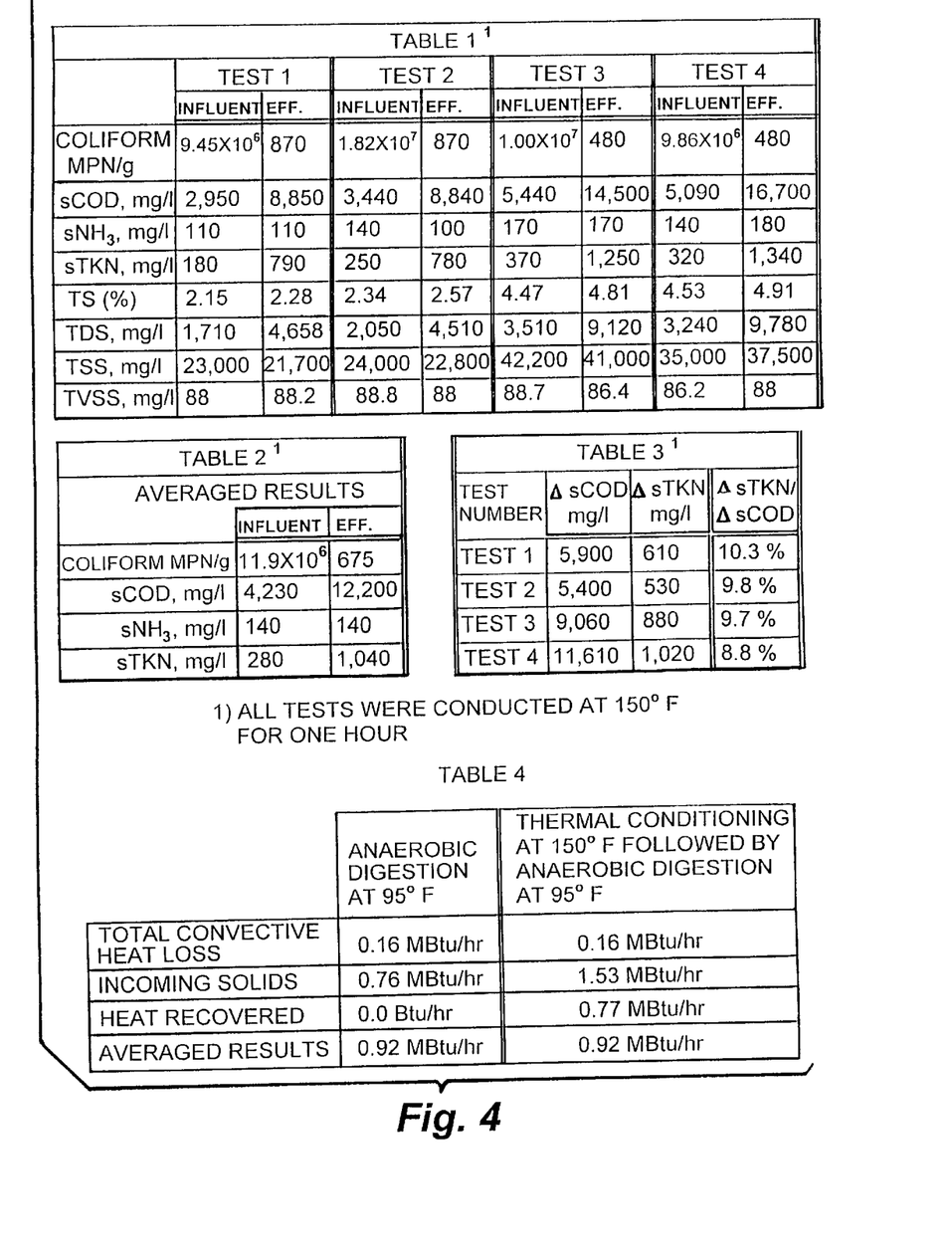
FIG. 4 illustrates tables related to the process described herein.

FIG. 4 illustrates tables 1–4 related to the process of thermal conditioning for pathogen reduction and solids solubilization. Thermal conditioning reduces pathogens in the solids prior to digestion. Death curves are available showing the effect of time and temperature on the destruction of pathogens (Feachem and Others, 1980). These curves show that pathogen destruction requires less time with increased process temperature. The EPA (Environmental Protection Agency) developed the equation given in Alternative 1 of the 503 Regulation to determine acceptable time and temperature relationships. A temperature of 150° F. requires about an hour detention to achieve sufficient pathogen reduction as required for the Class A standard.

The one hour detention time allows for a small thermal conditioning tank 54. Furthermore, the one hour detention makes batch feed feasible. The benefit of batch feed is the assurance that pathogen levels will not be exceeded due to short circuiting. (In comparison, a 130° F. temperature would require over 28 hours to achieve Class A pathogen reduction making batch feed less attractive.)

Table 1 shows the results of four bench scale tests of thermal conditioning. The bench scale tests consisted of heating biosolids mixtures of ⅔ primary sludge and ⅓ waste activated sludge (v/v) to 150° F. for one hour in a 2 liter beaker. The beaker was covered with plexiglass; and a mixer shaft extended through a hole in the plexiglass to an impeller submerged in the biosolids to keep them well mixed. A $CO_2$ blanket was created by constantly bleeding regulated $CO_2$ through another hole in the plexiglass.

All four tests resulted in pathogen reduction below the Class A fecal coliform requirement of 1,000 MPN per dry gram. Influent fecal coliform averaged 11.9 million MPN per dry gram. Thermal conditioning reduced the fecal coliform to an average value of 675 MPN per dry gram. The total solids varied from 2.15 percent to 4.91 percent for these tests.

Another advantage of the thermal conditioning is the solubilization and breaking down of the solids, as shown in Table 2 of FIG. 4. Total dissolved solids (TDS), total kjedhal nitrogen (TKN) and chemical oxygen demand (COD) were parameters analyzed during the testing and reflect solids solubilization. Influent soluble COD averaged 4,230 mg/l. The average soluble COD increased to 12,200 mg/l after thermal conditioning. Prior to thermal conditioning, the soluble TKN average 280 mg/l and rose to an average soluble TKN of 1,040 mg/l after thermal conditioning. Influent TDS averaged 2,630 mg/l and increased to an average value of 7,020 mg/l after thermal conditioning.

A typical weight percent nitrogen in cell mass is 12.4 percent (Tchobanoglous and Burton, 1991, page 365). With soluble ammonia constant in the influent and effluent, the increase in soluble TKN indicates cell membranes were broken down. The ratio of the increase in soluble TKN to the increase in soluble COD ($\Delta TKN/\Delta COD \times 100$) ranged from 8.8 percent to 10.3 percent. Table 3 of FIG. 4 summarizes these results.

Figure 3:
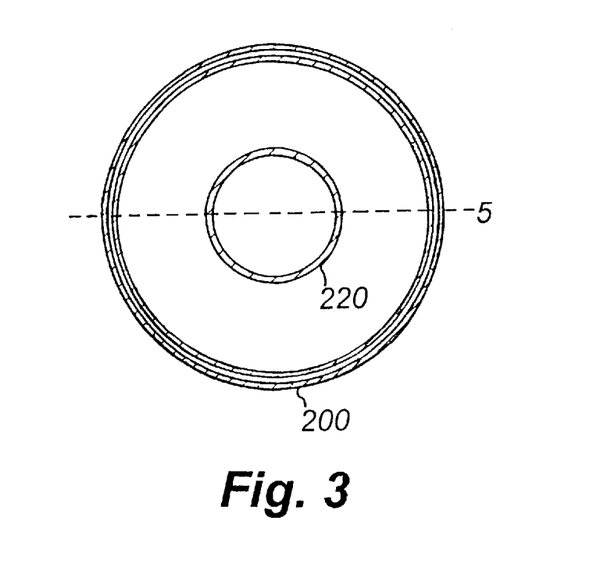
FIG. 3 is a cross-sectional view of the heat exchanger of FIG. 2.
Figure 5:
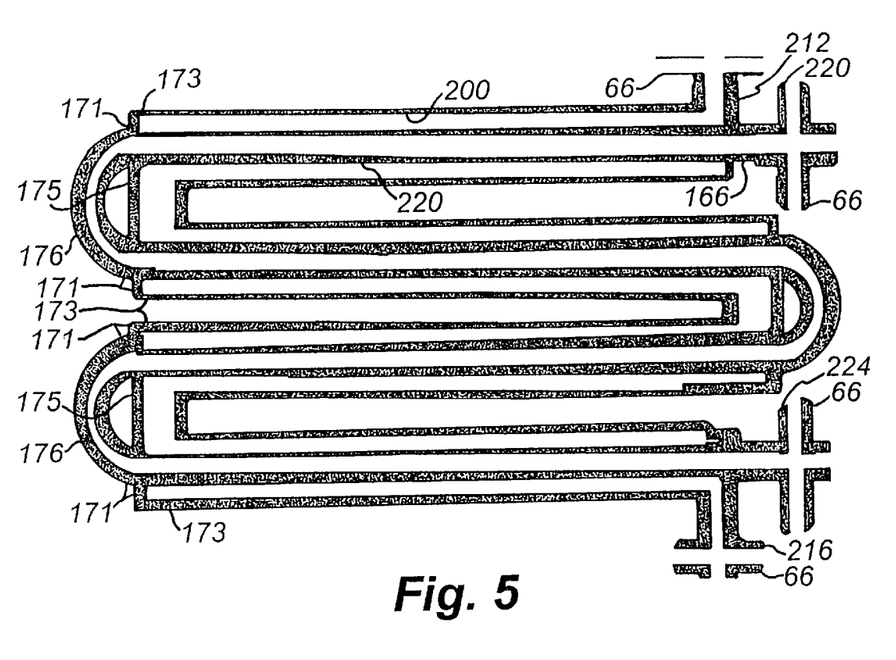
FIG. 5 illustrates a cross sectional view of heat exchanger 42' as illustrated in FIG. 2 along phantom line 5 shown in FIG. 3.

FIG. 5 illustrates a cross sectional view of a variant of heat exchanger 42' illustrated in FIG. 2 along phantom line 5 of FIG. 3. Outer tube 200 has a set of 90 degree corner portions 173 having a substantially flat walls 175. Removable semi-circular ends 176 are connected to walls 175 with connectors 171 which may be bolts or other types of fasteners. Removal of ends 176 allows for the cleaning of inner tube 220 without interfering with the continuous flow of solids through tube 200 thereby facilitating maintainance of the heat exchanger 42'.

HEAT RECOVERY EXAMPLE

Heat recovery allows for economical pathogen reduction by thermal treatment. The heat recovery system (portion) of apparatus 10 utilizes tube and tube heat exchanger 42, 42'. The process can be divided into six (6) steps which form the operational sequence of the heat recovery system. The addition and withdrawal of biosolids from the hot waste solids tank 64 and cold waste solids tank 20 is staggered and forms a two step heat recovery system which minimizes the required area. Two batches of hot, thermally treated waste solids heat a single batch of untreated waste solids. Conversely, two batches of cold, unconditioned waste solids cool a treated batch of biosolids. Furthermore, the batch operation of the heat recovery assures that the time and temperature requirement has been met for pathogen reduction.

Table 4 of FIG. 4 summarizes the benefits of heat recovery. The table has a convective heat loss based on a 60' diameter digester with 22' side wall depth, an ambient air temperature of –10° F. and a influent feed solids temperature and flow rate of 40° F. and 40,000 gallons per day, respectively. Also, the following U-values, in Btu/hrft²° F., were assumed: 0.22 for the cover, 0.27 for the side wall and 0.11 for the floor.

Table 4 of FIG. 4 also summarizes the heat balance associated with implementing thermal conditioning at 150° F. with heat recovery. An assumption is negligible heat loss from the well insulated 14' diameter by 16' tall thermal conditioning tank 54. The heat associated with raising the solids to 150° F. is recovered thereby maintaining the heat requirement with respect to 95° F.

Heat Recovery: Step 1

Thickened, unconditional biosolids 156 are pumped into cold waste solids tank 20.

Heat Recovery: Step 2

Next, the hot waste solids pump 82 and cold waste solids pump 36 are turned on. Hot solids, partially cooled and at approximately 123° F., are pumped through the outer tube 200 of heat exchanger 42, or 42'. Simultaneously, cold solids initially at 40° F. are pumped through inner tube 220 of heat exchanger 42, or 42'. The hot and cold waste solids are recirculated for a time period necessary to transfer a sufficient amount of heat and reach present temperature set points for the cold waste solids tank 20 and hot waste solids tank 64.

Heat Recovery: Step 3

Step 3 begins once the cold solids have been warmed to 63° F. and the hot solids have been cooled to a final temperature of 97° F. Heat losses through the walls and cover of anaerobic digester 112 will be accounted for by the hot solids entering digester 112 at a temperature above the normal operating temperature. As heat losses in digester 112 increase, due to colder air temperatures, the temperature of the thermally conditioned solids to digester 112 will also be increased. Step 3 is comprised of the cooled and thermally conditioned solids being pumped into anaerobic digester 112 over a 5 minute time period.

Heat Recovery: Step 4

Hot solids tank 64 is filled with thermally conditioned solids at 150° F.

Heat Recovery: Step 5

Next, in Step 5, the hot waste solids pump 82 and cold waste solids pump 36 are again turned on. Hot solids at 150° F., are pumped through outer tube 200 of heat exchanger 42, or 42'. Simultaneously, cold solids now at 63° F. are pumped through inner tube 220 of heat exchanger 42, or 42'. Heat transfer requires approximately 5 minutes; warming the cold solids to 93° F. and cooling the hot solids to 123° F.

Heat Recovery: Step 6

The warmed and untreated solids are pumped into the thermal conditioning tank 54 over a 5 minute time period.

Heat Recovery: Repeat Steps

Finally, the process for thermal conditioning is repeated beginning with Step 1. Cold, untreated solids are pumped into cold waste solids tank 20.

The overall process is thermal conditioning followed by anaerobic digestion in digester 112. The addition of tank for thermal conditioning 54 and heat exchanger 42 constitute the main components to retrofit an existing anaerobic digestion system into one capable of producing Class A Biosolids.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

What is claimed is:

1. A heat exchanger for transferring heat between first waste solids and second waste solids, said heat exchanger comprising:

a first waste solids source for supplying first waste solids;

a second waste solids source for supplying second waste solids the second waste solids being at a temperature different from the first waste solids;

a heat transfer portion remotely located from said first waste solids source and said second waste solids source, said heat transfer portion including a first conduit having a first entry port fluidly interconnected with said first waste solids source so as to receive first waste solids from said first waste solids source and a first discharge port fluidly interconnected with said first waste solids source such that at least a portion of the first waste solids passed through said first conduit is returned to said first waste solids source, and a second conduit fluidly interconnected with said second waste solids source such that second waste solids from said second waste solids source are passed through said heat transfer portion, said second conduit having a thermally-conducting wall disposed substantially adjacent said first conduit and for transferring heat between first waste solids passed through said first conduit and second waste solids passed through said second conduit.

2. The heat exchanger of claim 1 wherein said heat transfer portion includes a tube-in-tube heat exchanger assembly, wherein said first conduit includes an outer tube of said heat exchanger assembly and said second conduit includes an inner tube of said heat exchanger assembly disposed substantially inside said outer tube, and wherein said thermally-conducting wall includes a tube wall of said inner tube.

3. The heat exchanger of claim 1 wherein said second conduit has a second entry port fluidly interconnected with said second waste solids source so as to receive second waste solids from said second waste solids source and a second discharge port fluidly interconnected with said second waste solids source such that at least a portion of the second waste solids passed through said second conduit is returned to said second waste solids source.

4. A heat exchanger for transferring heat between first waste solids and second waste solids, said heat exchanger comprising:

a first waste solids source for supplying first waste solids;

a second waste solids source separate from said first waste solids source and for supplying second waste solids, the second waste solids being at a temperature different from the first waste solids;

a heat transfer portion remotely located from and fluidly interconnected with said first waste solids source and said second waste solids source, said heat transfer portion including
   a first channel in fluid communication with said first waste solids source such that first waste solids from said first waste solids source are passed through said first channel, and
   a second channel in fluid communication with said second waste solids source such that second waste solids from said second waste solids source are passed through said second channel, said second channel having a thermally-conducting wall disposed substantially adjacent said first channel for transferring heat between first waste solids and second waste solids passing through said heat transfer portion;
a recirculating system fluidly interconnected with said first channel such that at least a portion of the first waste solids is passed through said first channel at least twice, wherein said first channel has an inlet and an outlet, and wherein said recirculating system includes a conduit connecting said outlet to said inlet so that the portion of the first waste solids passed through said first channel is recirculated through said first channel;
a valve fluidly connected to said conduit and operable to selectively direct at least a portion of the first waste solids through said conduit such that the portion of the first waste solids is recirculated through said first channel; and
a tank fluidly connected with and receiving waste solids from said first waste solids source, wherein said valve is operable to selectively direct the portion of the first waste solids through said recirculation system to return to said first waste solids source and to direct an other portion of the first waste solids to said tank.

5. The heat exchanger of claim 4 wherein said tank is a treatment vessel fluidly connected to and receiving first waste solids from said first waste solids source, wherein said first waste solids source is connected with said first channel and said conduit such that first waste solids are recirculated through said first channel to said first waste solids source, and wherein said valve is operable to direct the portion of the first waste solids through said recirculating system to return to said first waste solids source and to direct an other portion of the first waste solids to said treatment vessel.

6. The heat exchanger of claim 4 wherein said tank is a receiving vessel fluidly connected to and receiving first waste solids from said first waste solids source, wherein said first waste solids source is connected with said first channel and said conduit such that first waste solids are recirculated through said first channel to said first waste solids source, and wherein said valve is operable to direct the portion of the first waste solids through said recirculating system to return to said first waste solids source and to direct an other portion of the first waste solids to said receiving vessel.

7. A heat exchanger for transferring heat between first waste solids and second waste solids, said heat exchanger comprising:
   a first waste solids source for supplying first waste solids;
   a second waste solids source separate from said first waste solids source and for supplying second waste solids, the second waste solids being at a temperature different from the first waste solids;
   a heat transfer portion remotely located from and fluidly interconnected with said first waste solids source and said second waste solids source, said heat transfer portion including
      a first channel in fluid communication with said first waste solids source such that first waste solids from said first waste solids source are passed through said first channel, and
      a second channel in fluid communication with said second waste solids source such that second waste solids from said second waste solids source are passed through said second channel, said second channel having a thermally-conducting wall disposed substantially adjacent said first channel for transferring heat between first waste solids and second waste solids passing through said heat transfer portion;
   a first recirculating system fluidly interconnected with said first channel such that at least a portion of the first waste solids is passed through said first channel at least twice, wherein said first channel has an inlet and an outlet, and wherein said recirculating system includes a first conduit connecting said outlet of said first channel to said inlet of said first channel so that the portion of the first waste solids passed through said first channel is recirculated through said first channel; and
   a second recirculating system fluidly interconnected with said second channel such that at least a portion of the second waste solids is passed through said second channel at least twice, wherein said second channel has an inlet and an outlet, and wherein said second recirculating system includes a second conduit connecting said outlet of said second channel to said inlet of said second channel so that the portion of the second waste solids is recirculated through said second channel.

8. The heat exchanger of claim 7, further comprising:
   a tank fluidly connected with and receiving first waste solids from said first waste solids source; and
   a valve fluidly connected to said first conduit and operable to selectively direct the portion of the first waste solids through said first recirculating system to return to said first waste solids source and to direct an other portion of the first waste solids to said tank.

9. The heat exchanger of claim 8, further comprising:
   a second tank fluidly connected with and receiving second waste solids from said second waste solids source; and
   a second valve fluidly connected to said second conduit and operable to selectively direct the portion of the second waste solids through said second recirculating system to return to said second waste solids source and to direct an other portion of the second waste solids to said second tank.

10. A heat exchanger for transferring heat from first waste solids to second waste solids, said heat exchanger comprising:
   a first waste solids source for supplying first waste solids;
   a second waste solids source separate from said first waste solids source and for supplying second waste solids, the second waste solids being at a temperature different from the first waste solids;
   a heat transfer device remotely located from and fluidly interconnected with said first waste solids source and said second waste solids source, said heat transfer device including
      a first channel in fluid communication with said first waste solids source and for conveying first waste solids from said first waste solids source, and
      a second channel in fluid communication with said second waste solids source and for conveying second waste solids from said second waste solids source, said second channel having a thermally-conducting wall disposed substantially adjacent said first channel for transferring heat between first waste solids and second waste solids passing through said heat transfer device; and a recirculating system for selectively causing recirculating flow of first waste solids from said first waste solids source through said first channel and back to said first waste solids source.

11. The heat exchanger of claim 10, further comprising:

a first pump in communication with said first waste solids source and for passing first waste solids from said first waste solids source through said heat transfer device; and a second pump in communication with said second waste solids source and for passing second waste solids from said second waste solids source through said heat transfer device.

12. The heat exchanger of claim 10 wherein said first channel includes an outer tube dimensioned and constructed to conduct first waste solids through said outer tube, and wherein said second channel includes an inner tube dimensioned and constructed to conduct second waste solids through said inner tube, the second waste solids being at a temperature less than the first waste solids.

13. The heat exchanger of claim 10 wherein said first channel includes an outer tube dimensioned and constructed to conduct first waste solids through said outer tube, and wherein said second channel includes an inner tube dimensioned and constructed to conduct second waste solids through said inner tube the second waste solids being at a temperature greater than the first waste solids.

14. The heat exchanger of claim 10 wherein said first channel has an inlet and an outlet, and wherein said recirculating system includes a conduit connecting said outlet to said inlet so that a portion of the first waste solids is recirculated through said first channel and returned to said first waste solids source.

15. The heat exchanger of claim 14, further comprising a valve fluidly connected to said conduit and operable to selectively direct at least a portion of the first waste solids through said conduit such that the portion of the first waste solids is recirculated through said first channel.

16. The heat exchanger of claim 10, further comprising a second recirculating system for selectively causing recirculating flow of second waste solids from said second waste solids source through said second channel and back to said second waste solids source.

17. The heat exchanger of claim 10, further comprising a treatment vessel fluidly connected to and receiving first waste solids for said first waste solids source, a portion of the first waste solids being directed through said recirculating system to return to said first waste solids source and an other portion of the first waste solids being directed to said treatment vessel.

18. The heat exchanger of claim 10, further comprising a receiving vessel fluidly connected to and receiving first waste solids from said first waste solids source, a portion of the first waste solids being directed through said recirculating system to return to said first waste solids source and an other portion of the first waste solids being directed to said receiving vessel.

19. A heat exchanger for transferring heat from first waste solids to second waste solids, said heat exchanger comprising:

a first waste solids source for supplying first waste solids;

a second waste solids source remote from said first waste solids source and for supplying second waste solids, the second waste solids being at a temperature different from the first waste solids;

a heat transfer device remote from said first waste solids source and said second waste solids source, said heat transfer device including a first channel in fluid communication with said first waste solids source for passing first waste solids through said heat transfer device, said first channel having an inlet and an outlet, and a second channel in fluid communication with said second waste solids source for passing second waste solids through said heat transfer device such that, when first waste solids and second waste solids move through said heat transfer device, heat is transferred between the first waste solids and the second waste solids; and a recirculation device fluidly interconnecting said first waste solids source and said first channel such that at least a portion of the first waste solids from said first waste solids source is passed through said first channel and returned to said first waste solids source, said recirculation device including a conduit connecting said outlet to said inlet so that the portion of the first waste solids is recirculated through said first channel and returned to said one of said first waste solids source.

20. The heat exchanger of claim 19 wherein said heat transfer device is removably connected to said first waste solids source and to said second waste solids source.

21. The heat exchanger of claim 19 wherein said heat transfer device includes an outer tube defining said first channel and an inner tube defining said second channel.

22. The heat exchanger of claim 19 wherein said heat transfer device includes an outer tube defining said second channel and an inner tube defining said first channel.

23. The heat exchanger of claim 19 wherein said heat transfer device further includes at least one bend, at least one linear portion adjacent said bend, and at least one bend connector removably connecting said bend to said linear portion.

24. The heat exchanger of claim 19, further comprising a second recirculation device fluidly interconnecting said second waste solids source said second channel such that at least a portion of the second waste solids from said second waste solids source is passed through said second channel and returned to said second waste solids source, wherein said second channel has an inlet and an outlet, and wherein said second recirculation device includes a second conduit connecting said outlet of said second channel to said inlet of said second channel so that the portion of the second waste solids is recirculated through said second channel.

* * * * *